United States Patent
East et al.

(10) Patent No.: US 10,486,997 B2
(45) Date of Patent: Nov. 26, 2019

(54) JOINING MEMBERS USING ADDITIVE MANUFACTURING

(71) Applicant: Goodrich Corporation, Charlotte, NC (US)

(72) Inventors: Matthew J. East, Danbury, CT (US); Daniel E. Dunn, Bethel, CT (US); Kramer Harrison, Norwalk, CT (US); Bari M. Southard, Bridgewater, CT (US)

(73) Assignee: Goodrich Corporation, Charlotte, NC (US)

( * ) Notice: Subject to any disclaimer, the term of this patent is extended or adjusted under 35 U.S.C. 154(b) by 385 days.

(21) Appl. No.: 15/348,483

(22) Filed: Nov. 10, 2016

(65) Prior Publication Data
US 2018/0127298 A1  May 10, 2018

(51) Int. Cl.
| | | |
|---|---|---|
| B29C 70/74 | (2006.01) | |
| C03B 23/20 | (2006.01) | |
| C03B 19/01 | (2006.01) | |
| B22F 3/105 | (2006.01) | |
| B29C 64/153 | (2017.01) | |
| B33Y 10/00 | (2015.01) | |
| B33Y 80/00 | (2015.01) | |
| C03B 23/203 | (2006.01) | |
| B23K 1/005 | (2006.01) | |
| C03C 27/00 | (2006.01) | |
| C03C 27/10 | (2006.01) | |

(52) U.S. Cl.
CPC ............ C03B 19/01 (2013.01); B22F 3/1055 (2013.01); B23K 1/0056 (2013.01); B29C 64/153 (2017.08); B33Y 10/00 (2014.12); B33Y 80/00 (2014.12); C03B 23/203 (2013.01); C03C 27/00 (2013.01); C03C 27/10 (2013.01)

(58) Field of Classification Search
CPC ... B22F 3/1055; B23K 1/0056; B29C 64/153; B29C 70/74; C03B 19/01; C03B 23/20; C03B 23/203
USPC .................. 264/261, 263, 497; 65/36, 59.1; 219/121.14, 121.17, 121.35, 121.64, 219/121.66, 121.85
See application file for complete search history.

(56) References Cited

U.S. PATENT DOCUMENTS

| | | | |
|---|---|---|---|
| 5,902,498 A | * | 5/1999 | Mistry ................. B23K 1/0056 219/121.64 |
| 8,590,342 B2 | | 11/2013 | Koike et al. |
| 2003/0226377 A1 | | 12/2003 | Barrett et al. |

(Continued)

FOREIGN PATENT DOCUMENTS

EP    2840071 A1    2/2015

OTHER PUBLICATIONS

Extended European Search Report prepared by the European Patent Office, dated Jan. 9, 2018, issued in corresponding European Patent Application No. 17201137.1.

*Primary Examiner* — Leo B Tentoni
(74) *Attorney, Agent, or Firm* — Locke Lord LLP; Daniel J. Fiorello; Joshua L. Jones

(57) ABSTRACT

A method includes placing a first part proximate a second part, disposing a sintering material in contact with both the first part and the second part, and applying energy to the sintering material to join the first part and the second part. An apparatus includes a first part, a second part, and an additively manufactured joint comprising a sintering material that joins the first part and the second part.

9 Claims, 3 Drawing Sheets

(56) References Cited

U.S. PATENT DOCUMENTS

| | | |
|---|---|---|
| 2006/0046075 A1 | 3/2006 | Maul et al. |
| 2008/0128053 A1* | 6/2008 | Jansen .................. B23K 26/24 |
| | | 219/121.64 X |
| 2010/0218556 A1 | 9/2010 | Carberry et al. |
| 2015/0056415 A1 | 2/2015 | Southard |

* cited by examiner

JOINING MEMBERS USING ADDITIVE MANUFACTURING

BACKGROUND

1. Field

The present disclosure relates to additive manufacturing, e.g., using low expansion glass (e.g., for optical systems and components).

2. Description of Related Art

Traditional methods for joining glass members include adhesive bonding, frit bonding, and optical contact bonding. Frit bonding and adhesive bonding have been observed to introduce instability in optical systems, with respect to changes in temperature, hygroscopic behavior, and chemical changes over time. Optical contact bonding may not always fully develop the strength of the glass structure.

Such conventional methods and systems have generally been considered satisfactory for their intended purpose. However, there is still a need in the art for improved systems and methods for joining glass members. The present disclosure provides a solution for this need.

SUMMARY

A method includes placing a first part proximate a second part, disposing a sintering material in contact with both the first part and the second part, and applying energy to the sintering material to join the first part and the second part. Disposing the sintering material and applying energy can be repeated to create successive layers of sintered material.

The sintering material includes titania-silica powder. The sintering material can include titania-silica suspension.

The first part and second part can be made of glass. The first part and the second part can be made of titania-silica glass.

Applying energy to the sintering material includes laser sintering the sintering material. Any other suitable energy application (e.g., electron beam welding) is contemplated herein.

An apparatus includes a first part, a second part, and an additively manufactured joint comprising a sintering material that joins the first part and the second part. The additively manufactured joint can include successively sintered layers of sintering material.

The sintering material can include titania-silica (e.g., formed from powder or suspension). The first part and second part can be made of glass (e.g., titania-silica glass). At least one of the first part and/or the second part can be optical components. The first part and the second part may have been broken from a previous single component.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
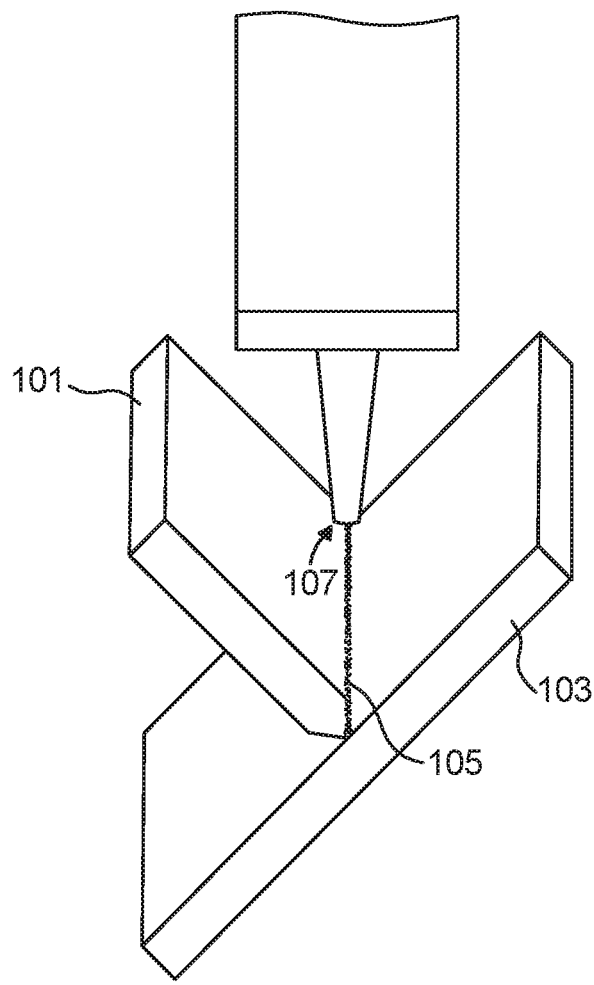
FIG. 1 is a diagrammatic view of a portion of an embodiment of a method in accordance with this disclosure, showing deposition of sintering material.
Figure 2:
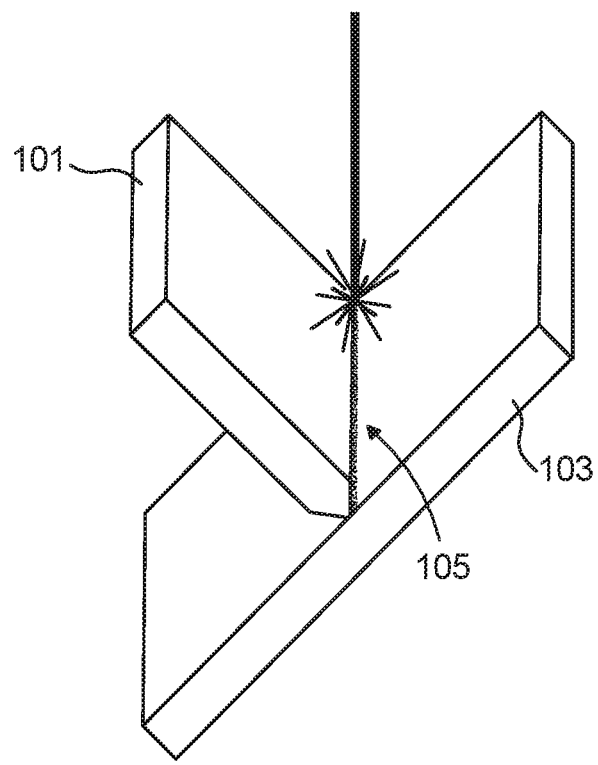
FIG. 2 is a diagrammatic view of a portion of an embodiment of a method in accordance with this disclosure, showing energy application to the deposited sintering material.
Figure 3:
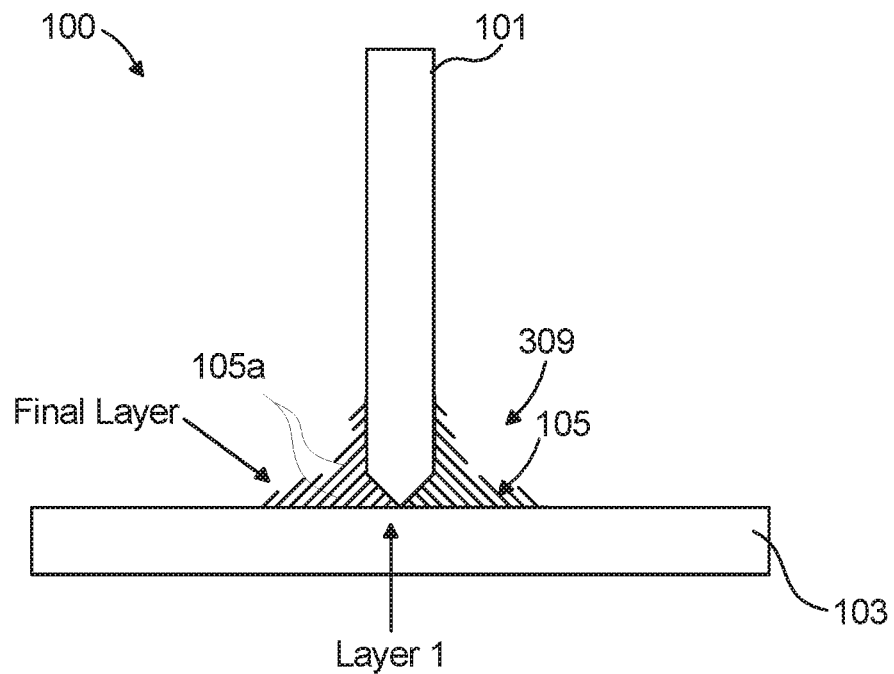
FIG. 3 is a schematic cross-sectional view of an embodiment of an apparatus in accordance with this disclosure.
Figure 4:
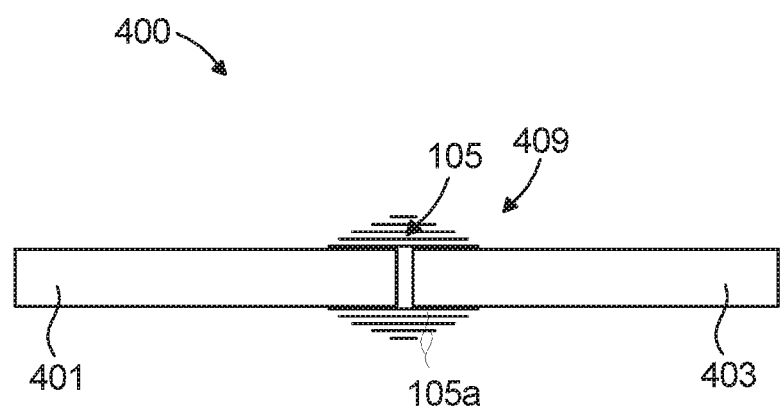
FIG. 4 is a schematic cross-sectional view of an embodiment of an apparatus in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIGS. 1 and 2 and is designated generally by reference character 100. Other embodiments and/or aspects of this disclosure are shown in FIGS. 3 and 4. The systems and methods described herein can be used to join two members (e.g., glass members for optical components, e.g., made of titania-silica glass).

Referring to FIGS. 1 and 2, a method in accordance with this disclosure is diagrammatically shown. The method includes placing a first part 101 proximate a second part 103. The first part 101 and the second part may be fixed in place relative to each other to prevent relative motion therebetween in any suitable manner.

In certain embodiments, the first part 101 and/or the second part 103 can be made of glass (e.g., titania-silica glass). For example, the first part 101 and/or the second part 103 can be made of titania-silica glass.

Referring to FIG. 1, the method includes disposing a sintering material 105 in contact with both the first part 101 and the second part 103. The sintering material 105 can be deposited in any suitable manner, e.g., via a nozzle 107 with or without pressurization.

In certain embodiments (e.g., where the first part 101 and/or second part 103 are made of titania-silica glass), the sintering material 105 can include titania-silica powder. In certain embodiments (e.g., where the first part 101 and/or second part 103 are made of titania-silica glass), the sintering material 105 can include titania-silica suspension. Any other suitable material is contemplated herein, e.g., for joining glass components.

Referring to FIG. 2, the method includes applying energy to the sintering material 105 to join the first part 101 and the second part 103. Applying energy to the sintering material can include laser sintering the sintering material 105 as shown. Any other suitable energy application (e.g., electron beam welding) is contemplated herein.

Disposing the sintering material 105 (e.g., as shown in FIG. 1) and applying energy (e.g., as shown in FIG. 2) can be repeated to create successive layers of sintered material as needed for a suitably strong joint for the desired function thereof. Successively formed layers can form any suitable thickness and or shape as appreciated by those having ordinary skill in the art in view of this disclosure.

Referring to FIG. 3, an apparatus 100 formed by the above method includes a first part 101 as described above, a second part 103 as described above, and an additively manufactured joint 309 comprising a sintering material 105 that joins the first part 101 and the second part 103.

The additively manufactured joint 309 can include successively sintered layers 105a of sintering material 105. As shown in FIG. 3, the layers 105a may not be uniform, nor does each layer 105a have to contact each part 101, 103. Any suitable layering and/or shape for the additively manufactured joint 309 is contemplated herein.

In certain embodiments, at least one of the first part 101 and/or the second part 103 can be optical components (e.g., mirror substrate, lens, etc.) for any suitable use. For example, the parts 101, 103 can be portions of a glass mirror substrate which had broken apart due to fracture. The parts 101, 103 may be structural members which are combined to construct a low expansion titania-silica glass mirror optic. For example, segments of rigid mirror core structure may be joined together to create large structures, or an optical facesheet can be joined to a rigid core structure.

The first part 101 and/or the second part 103 can be used for any other suitable purpose. In this regard, the first part 101 and the second part 103 can be positioned relative to each other in any suitable manner. For example, as shown in FIG. 3, the first part 101 can extend perpendicular from the second part 103 and include a tapered end, e.g., to enhance joining via sintering.

Referring to FIG. 4, for example, an apparatus 400 can include a first part 401 similar as described above and a second part 403 similar as described above that are joined side by side via an additively manufactured joint 409 (e.g., which can be made on both sides of the parts 401, 403). As shown, the joint 409 can be tapered in shape layer by layer to the top most layer. As described above, any other suitable shape and/or number of layers is contemplated herein.

As described above, titania-silica glass members can be welded together using low expansion titania-silica glass powder, suspension, or drawn fiber as a filler/sintering material for example. The parts 101, 103 can have loosely-matched surfaces, which are first abutted together. Low expansion titania-silica glass material may be used to fill the gap between the faying surfaces, and melted as it is exposed to laser irradiation, for example. As the low expansion titania-silica glass material rapidly cools, it is fused into glass, joining low expansion titania-silica glass parent members, for example. As shown above, low expansion titania-silica glass powder, suspension, or drawn fiber may also be additively deposited in thin layers around the faying surface, which can be fused layer by layer to build glass around the joint, reinforcing the welded joint.

The sintering material in the faying surface may be exposed to high intensity laser irradiation which can be selected to pass through one or more of the low expansion titania-silica glass members. The wavelength of the laser source can be chosen such that it transmits through glass low expansion titania-silica glass with minimal loss, but is absorbed by the powder or suspension at the faying surface.

Embodiments as described above offer improved strength, thermal stability, chemical stability, and hygroscopic stability, as compared to traditional methods for joining glass member and/or constructing glass optics. Also, methods of this disclosure can enable repair of broken optical components (e.g., repair of a glass mirror substrate) while preserving high thermal stability and fully restoring the strength of the repaired joint, for example. Also, broken optical elements can be repaired to have the same or similar optical characteristics as to the original component.

The methods and systems of the present disclosure, as described above and shown in the drawings, provide for methods and apparatuses with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method, comprising:
placing a first part proximate a second part;
disposing a sintering material in contact with both the first part and the second part;
applying energy to the sintering material; and
joining the first part and the second part, wherein disposing the sintering material and applying energy are repeated to create successive layers of sintered material.

2. The method of claim 1, wherein the sintering material includes titania-silica powder.

3. The method of claim 1, wherein the sintering material includes titania-silica suspension.

4. The method of claim 1, wherein the first part and second part are made of glass.

5. The method of claim 4, wherein the first part and the second part are made of titania-silica glass.

6. The method of claim 1, wherein applying energy to the sintering material includes laser sintering the sintering material.

7. A method, comprising:
placing a first part proximate a second part;
disposing a sintering material in contact with both the first part and the second part;
applying energy to the sintering material; and
joining the first part and the second part, wherein the sintering material includes titania-silica powder.

8. A method, comprising:
placing a first part proximate a second part;
disposing a sintering material in contact with both the first part and the second part;
applying energy to the sintering material; and
joining the first part and the second part, wherein the sintering material includes titania-silica suspension.

9. A method, comprising:
placing a first part proximate a second part;
disposing a sintering material in contact with both the first part and the second part;
applying energy to the sintering material; and
joining the first part and the second part, wherein the first part and second part are made of glass, wherein the first part and the second part are made of titania-silica glass.

* * * * *